3,321,408
STABLE OPACIFIED EMULSION
Benjamin R. Briggs, Los Alamitos, Calif., assignor to Purex Corporation, Ltd., Lakewood, Calif., a corporation of California
No Drawing. Filed Feb. 28, 1966, Ser. No. 530,401
15 Claims. (Cl. 252—161)

This application is a continuation-in-part of my copending application Ser. No. 232,563, filed Oct. 23, 1962, and now abandoned.

This invention relates to opacifier compositions and to methods for their preparation. More particularly, this invention relates to stabilization of emulsion polymers.

It is frequently desirable to add an opacifying material, i.e., a solid dispersed resin to a variety of commercial products, particularly in the detergent and cosmetic fields, in order to enhance the appearance of the product and improve the saleability thereof. Optimally, such opacifying material should be readily dispersable in liquid detergent, cosmetics and the like and stable under storage for long periods of time. Moreover, the opacifying material should also be capable of producing any degree of opacity desired in the product to which it is added as well as be inherently stable in the presence of a wide variety of organic compounds ordinarily found in detergent and cosmetic preparations, particularly the alcohols.

Opacifying resins are dispersions of solid particulate resins in a nonsolvating medium such as water. Polymer dispersions produced by emulsion polymerization of any of many vinyl monomers are known. Preparation of vinyl polymer dispersions is taught for example in U.S. Pat. 2,545,702 to Norris. There, in an aqueous emulsion polymerization medium, including, as a dispersing resin, a vinyl acetate-maleic anhydride copolymer, styrene monomer is polymerized to a suspension of polystyrene.

The term "emulsion" is properly used to describe a system in which the separate phases are both liquid. A system wherein one phase is solid and one liquid is properly termed a "suspension." Both emusions and suspensions are included in the term "dispersion." In the art of dispersion resins, however, often the term "emulsion" is used interchangeably with the term "dispersion" to include both emulsions, properly denoted, and suspensions. "Emulsion" will be used in this broader sense in the present specification and claims.

While many emulsion polymers have been prepared long term stability in certain environments continues to be a problem, particularly in organic environments, such as aqueous alcohols.

Accordingly, it is an object of the present invention to provide an opacifier composition and methods for the preparation thereof which produce any desired degree of opacity in the product with which it is used, which is stable in the presence of a wide variety of organic compounds, and which will not deteriorate upon storage over long periods of time.

It is another object of the present invention to provide resinous polymers and methods for their preparation which are useful as suspending agents in the production of opacifier emulsions.

It is another object to provide opacified detergent formulations stable on standing against deterioration by separating or creaming.

The foregoing objects and still further objects are broadly accomplished according to the method of the present invention by the emulsion polymerization including copolymerization of one or more vinyl type monomers using a resinous copolymer of two different vinyl ester monomers, a lower and a higher vinyl ester monomer, and crotonic acid as an emulsifying or suspending agent to produce an opacifier latex having the desired characteristics.

Crotonic acid or 2-butenoic acid has the formula $CH_3CH=CHCOOH$, a molecular weight of 86.09 and exists and is useful in $\alpha$ and $\beta$ forms. Crotonic anhydride and crotyl halides which become crotonic acid in the terpolymer polymerization system can also be employed in preparing the terpolymer. Crotonic acid has been copolymerized with vinyl monomer before. In French Pat. 1,252,236, a copolymer of a lower vinyl ester, vinyl acetate and crotonic acid is employed in the preparation of a vinyl chloride polymer dispersion. Such dispersions, however, are not stable as an opacifying latex over as long a period as those prepared with a higher saturated aliphatic acid vinyl ester as a termonomer in accordance with this invention. In U.S. Pat. 2,263,598, a terpolymer of crontonic acid with two different vinyl ester monomers is taught. No disclosure is provided, however, in this latter patent of any utility for these compositions in emulsion polymerization or dispersion stabilization.

The essential point of the present invention is the discovery that a terpolymer of crotonic acid and two different vinyl ester monomers, a lower vinyl ester and a higher vinyl ester, exhibit stabilizing properties surprisingly superior to copolymers of these monomers.

Generally, ethylene and any vinyl monomer can be used to produce an opacifying emulsion polymer in accordance with the present invention except those which undergo hydrolysis during the polymerization process, such as vinyl pyrrolidone and vinyl formate. Among the preferred non-hydrolysing vinyl monomers suitable for use according to the present invention are vinyl acetate, vinyl propionate, vinyl butyrate, styrene, vinyl toluene, and vinyl xylene. Moreover, monomers having a double bond in the molecule placed similarly to that of the foregoing vinyl monomers, such as acrylic and methacrylic monomers, butadiene or ethylidene chloride and the like can also be used. For example, 2-ethyl hexyl acrylate is particularly useful as a comonomer in the emulsion copolymerization thereof with any of the aforementioned vinyl monomers. It will be understood, therefore, that within the class of "vinyl monomers" as that term is used in the description of this invention are included all those monomers having a double bond in the molecule thereof normally attached to a terminal carbon atom and the next adjacent carbon atom followed by a single bond between the second and third carbon atoms of the molecule and which can normally be polymerized without hydrolysis.

Broadly speaking, vinyl monomers may be considered to be any molecule capable of undergoing free radical or additional polymerization according to the following scheme:

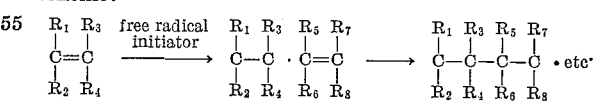

where $R_{1-8}$ may be H, an alkyl radical, or an alkaryl radical the hydrogens of which may be substituted by organic or inorganic groups including such functional groups as $—COOR$, $—NH_3$, $—CN$, and the like. $R_{1-8}$ may not, however, introduce a carbon double bond next to each other to produce adjacent double bonds. On the other hand, with conjugated double bonds or adjacent double bonds wherein the second linkage is to an atom other than carbon, polymerization may be augmented. Thus free radical polymers may be considered substituted ethylene derivatives wherein the main chain is composed entirely of carbon to carbon single bonds.

The lower vinyl ester-higher vinyl ester crotonic acid resin which is used in accordance with the method of the present invention is preferably prepared by suspension polymerization; however, any other of the various methods of free radical polymerization may be used, such as emulsion polymerization, solution polymerization or bulk polymerization.

Emulsion polymerization, however, is not desirable because of the retention of extraneous emulsifiers in the resulting resin. Solution polymerization requires the use of solvents which must be eliminated after the reaction in the further practice of the invention; and bulk polymerization is undesirable because of the difficulty of controlling the reaction of the vinyl comonomers used to prepare the resin.

In the preparation of the emulsifying resin by suspension polymerization two different vinyl ester monomers are mixed together with crotonic acid and, in the presence of a suitable catalyst and a chain transfer agent, if desired, dispersed in water containing a dispersing agent. Thereafter, the mixture is purged with nitrogen and heated to reflux with agitation. During subsequent reflux, additional catalyst and an anti-caking agent may be added, if desired.

The vinyl comonomers which are used to prepare the emulsifying resin of the present invention include as lower vinyl esters, vinyl acetate, vinyl propionate and vinyl butyrate and, there is also added a second vinyl ester, a higher vinyl ester selected from the vinyl esters of saturated aliphatic or fatty acids. Specifically, it has been found that the emulsifying properties of the resulting terpolymer are substantially improved by the use with crotonic acid of both a lower vinyl ester monomer, such as vinyl acetate and a higher vinyl ester of a saturated fatty acid having from twelve to twenty-two carbon atoms. The improved emulsifying properties of the terpolymer are exhibited in the increased stability of the resulting emulsion polymer of copolymer prepared therewith to water-soluble alcohols frequently present in detergent compositions, increased stability with respect to filterability, freedom from coagulum, and mechanical stability.

Stability in the present disclosure refers to resistance to flocculation caused by surface active agents in the presence of high proportions of water soluble alcohols. Instability is exhibited by creaming or settling out of the opacifier. Generally the dispersing resin is present in the amount sufficient to render the olefin polymer dispersion stable. Typically this amount is from 1 to 1 to 1 to 20, and preferably 1 to 3 to 1 to 7, parts by weight of dispersing resin to parts of opacifying olefin polymer.

As the higher vinyl ester there can be employed compounds having 12 to 22 carbon atoms in the ester group, e.g., the vinyl esters of saturated aliphatic acids such as the ester prepared from behenic, margaric, tridecylic, lauric, myristic, pentadecylic, palmitic, stearic, arachidic, nonadecylic acids and the like.

Esters of the unsaturated fatty acids are unsuitable because of their tendency to inhibit the polymerization of the other vinyl comonomer, as, for example, vinyl acetate. For convenience in distinguishing between the types of vinyl comonomers used in the preparation of the resinous suspending agent of the present invention, the term "lower vinyl monomer" will be applied to vinyl comonomers of the type of vinyl acetate and the term "higher vinyl monomer" will be applied to vinyl monomers of the longer chain type. Generally, an advantageous improvement in the emulsifying properties of the resin is achieved by the use of as little as 3% by weight of the higher vinyl ester, or 3 parts per 100 parts by weight of the terpolymer. Optimum stabilizing behavior is achieved by the use of an amount within the range of 10–20% by weight or 10 to 20 parts by weight per 100 parts of the terpolymer. The use of an amount of higher vinyl ester in amounts between 3 and 35 parts per 100 parts of terpolymer in the preparation of the emulsifying resin affords a considerable advantage in carrying out the second stage of the process of the present invention, namely, the emulsion polymerization or copolymerization of vinyl monomer in which the terpolymer is used as a suspending agent.

The ratio of the lower vinyl ester, the higher vinyl ester and crotonic acid required to produce the stable dispersants of the present invention are in the range of 70–94 parts of lower vinyl monomer, 3 to 20 parts of higher vinyl monomer and 3 to 10 parts of crotonic acid per 100 parts by weight of the dispersing interpolymer. Although as little as 3 parts of higher vinyl monomer per 100 parts by weight of interpolymer imparts the stability herein described to opacified alkaline aqueous alcohol solutions employing the interpolymer as a dispersing aid for the opacifying polymer, generally 10 to 20 parts will be employed per 100 parts by weight of the interpolymer for optimum stability in the final mixture.

While not wishing to be bound to any particular theory of operation it is believed the improved stability of opacifier latex prepared using the lower vinyl ester/higher vinyl ester/crotonic acid terpolymer as the emulsifying resin is attributable in large measure to the increased side chain length in the terpolymer achieved through use of the higher vinyl ester. Lower vinyl ester/crotonic acid copolymers lack long side chains and the ability to provide long term stable opacifying latex for detergents and the like. Long hydrocarbon side chains of 12 or more up to 22 carbon atoms are akin to materials having characteristic surfactant properties. This similarity is believed to result in greater compatibility between the side chain containing emulsifying resin and surfactants present in the system and enable a high degree of dispersion stability.

The catalysts which may be used to prepare the emulsifying resin according to the method of the present invention are of the conventional free-radical type, principal among which are peroxide-type polymerization catalysts and azo-type polymerization catalysts. Such catalysts can be inorganic or organic, the latter having the general formula R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include organic peroxides, e.g., benzoyl peroxide, ditertiary butyl peroxide, tertiary butyl peroxide, ditertiary butyl peroxide, tertiary butyl peroxide, diacetyl peroxide, diethyl peroxycarbonate, cumene hydroperoxide in organic peroxides, e.g., hydrogen peroxide, potassium persulfate, perborates and other "per" compounds. The azo-type polymerization catalysts are well known to those skilled in the art. These are characterized by the presence in the molecule of the group —N=N— bonded to one or two organic radicals, preferably at least one of the bonds being to a tertiary carbon atom. By way of example of suitable azotype catalysts can be mentioned α,α'-azodiisobutyronitrile, p - bromobenzenediazonium fluoborate, N-nitroso-p-bromoacetanilide, azo-methane, phenyldiazonium halides, diazoaminobenzene, p-bromobenzenediazonium hydroxide, p-tolyldiazoaminobenzene. The peroxytype or azo-type polymerization catalyst is used in small but catalytic amounts, which are generally not in excess of one percent by weight based upon the monomeric material. A suitable quantity is often in the range of 0.05 to 0.5 percent by weight. The amount of catalyst used is, in general, determined by the desired reaction rate.

In order to avoid the formation of an emulsion in the preparation of the vinyl monomers-crotonic acid terpolymer an oil soluble catalyst is preferably chosen and added to the monomeric mixture for initiating the reaction.

During the latter part of the reaction, water soluble catalysts may advantageously be added to react any unreacted residue of monomer.

The chain transfer agents suitable for use in the practice of the present invention are selected from compounds having an active hydrogen atom. Chain transfer agents are well known to those skilled in the art of free radical polymerization and an appropriate transfer agent can easily be selected from the available literature. In practice, the chain transfer agents most frequently used are long chain mercaptans of the aliphatic series although aldehydes, alcohols and halogenated hydrocarbons are also frequently used. In the practice of the present invention lauryl mercaptan has proved of especial utility as a chain transfer agent.

The quantity of chain transfer agent is chosen to regulate the molecular weight of the terpolymer. Molecular weight control is essential to the control of various physical properties of the polymers both with respect to the end-use application thereof and to the workability of the material during the forming processes. In the emulsifying resin of the present invention molecular weight is one of the factors determining the viscosity of the resin aqueous alkaline solution.

Suitable dispersing agents used to prepare the emulsifying terpolymer according to the method of the present invention include completely or partially hydrolyzed vinyl acetate polymers, starch, starch derivatives, such as starch acetate; methyl cellulose and hydroxyethyl cellulose; polyacrylates, polymethacrylate; alignates; water soluble salts of polycarboxylic acids; water insoluble inorganic oxides; hydroxides and salts; amino substituted polymers; algin; gelatin; chitin derivatives and natural gums, such as gum arabic or gum tragacanth. The foregoing list is illustrative only of the possible dispersing agents which may be used since almost any material having some hydrophilic characteristics might be useful as a dispersing agent. In the practice of the present invention, the use of a partly hydrolyzed poly(vinyl acetate) combines the advantage of good acid stability and good dispersability. A good degree of dispersion is essential in the production of the vinyl monomers-crotonic acid terpolymer of the present invention because of the high solubility of the vinyl monomers in the polymer.

It is frequently desirable to add an anticaking agent after the terpolymerization reaction is complete to prevent coalescence of the spherical resin particles. For this purpose a finely powdered silica may be used, such as Cab-o-sil, marketed by Godfrey W. Cabot, Inc., a colloidal silica prepared in a hot gaseous environment by vapor-phase hydrolysis of a silicon compound instead of by the usual aqueous precipitation process and which has the great advantage of a high degree of particle separation.

An emulsifying resin suitable for use as a suspending agent in the preparation of an opacifier emulsion in accordance with the method of the present invention may be prepared as follows. Principal ingredients and reactants are set forth within limiting ranges of percentage composition by weight and wherein conditions of temperature are set forth in degrees Fahrenheit:

Mix together 55–94% by weight of a lower vinyl monomer, such as vinyl acetate, 3–35% (preferably, 10–20%) of a higher vinyl monomer, such as vinyl stearate and 3–10% of crotonic acid. Add 0.01–5% of a suitable catalyst and up to 2% of a chain transfer agent. Disperse the monomer mixture in water equal to or up to 3 times the volume of the monomer mixture and containing 0.05–2% of a suitable dispersing agent. Place the mixture in a vessel equipped with an agitator and a reflux condenser. Purge the mixture with nitrogen for about 15 minutes and heat the mixture to reflux while maintaining agitation as rapidly as possible consistent with maintaining a reasonable foam level. Reflux begins at about 155°–160° F. Using external heat as required, raise the temperature to about 180–190° F. over a period of 2 to 4 hours. Agitation should be increased as much as possible in order to decrease solution of monomer in the polymer. Additional catalysts may be added from time to time throughout the reaction. Maintain the reaction mixture at about 190–200° F. for about 30 minutes during which time an anticaking agent may be added, if desired. Steam distillation may be used to aid in eliminating unreacted monomer. Cool rapidly and wash the resin free of residual monomer.

CONTROL I 516 parts of vinyl acetate was mixed with 24 parts of crotonic acid and to the monomeric mixture was added 4.5 parts of diisoazobutyronitrile and 1.5 parts of lauryl mercaptan. The reaction mixture was dispersed in 1000 parts of water containing 3 parts of a partly hydrolysed polyvinyl acetate. While maintaining vigorous agitation, the reaction mixture was heated to reflux and thereafter the temperature of the mixture was raised to 190° F. over a period of 3 hours. When the mixture ceased reflux, 3 parts of 98% hydrogen peroxide and 3 parts of colloidal silica are added. Thereafter, the reaction product was cooled rapidly to 60° F., washed, filtered and dried.

Example 1

60 parts of vinyl stearate were dissolved in 516 parts of vinyl acetate and the resulting solution was mixed with 24 parts of crotonic acid. To the monomeric mixture are added 4.5 parts of diisobutyronitrile and 1.5 parts of lauryl mercaptan. The reaction mixture is dispersed in 1000 parts of water containing 3 parts of a partly hydrolysed polyvinyl acetate. While maintaining vigorous agitation, the reaction mixture was heated to reflux and thereafter the temperature of the mixture was raised to 190° F. over a period of 3 hours. When the mixture ceased reflux, 3 parts of 98% hydrogen peroxide and 3 parts of colloidal silica were added. Thereafter, the reaction product was cooled rapidly to 60°, washed, filtered and dried.

The following are further examples setting forth specific materials and relative proportions thereof which are used to prepare emulsifying resins using the procedure of Example 1:

Example 2

| | Parts by weight |
|---|---|
| Vinvyl acetate | 55.0 |
| Vinyl behenate | 35.0 |
| Crotonic acid | 6.5 |
| Diazoaminobenzene | 1.0 |
| Methyl cellulose | 1.5 |
| Lauryl mercaptan | 1.0 |

Example 3

| | Parts by weight |
|---|---|
| Vinyl acetate | 65.0 |
| Vinyl margarate | 25.0 |
| Crotonic acid | 7.0 |
| Azomethane | 1.0 |
| Carboxy methyl cellulose | 1.0 |
| Lauryl mercaptan | 1.0 |

Example 4

| | Parts by weight |
|---|---|
| Vinyl propionate | 60.0 |
| Vinyl undecylate | 25.0 |
| Crotonic acid | 10.0 |
| p-Bromobenzenediazonium fluoride | 2.0 |
| Hydroxy ethyl cellulose | 1.0 |
| Lauryl mercaptan | 2.0 |

Example 5

| | Parts by weight |
|---|---|
| Vinyl propionate | 75.0 |
| Vinyl tridecylate | 15.0 |
| Crotonic acid | 8.0 |
| p-Bromobenzenediazonium hydroxide | 1.0 |
| Starch | 0.05 |
| Lauryl mercaptan | 0.05 |

Example 6

| | Parts by weight |
|---|---|
| Vinyl propionate | 70.0 |
| Vinyl laurate | 15.5 |
| Crotonic acid | 8.0 |
| p-Tolyldiazoaminobenzene | 3.0 |
| Starch acetate | 2.0 |
| Lauryl mercaptan | 1.5 |

Example 7

| | Parts by weight |
|---|---|
| Vinyl propionate | 65.0 |
| Vinyl myristate | 20.0 |
| Crotonic acid | 10.0 |
| Benzoyl peroxide | 2.0 |
| Polymethacrylate | 1.5 |
| Lauryl mercaptan | 1.5 |

Example 8

| | Parts by weight |
|---|---|
| Vinyl butyrate | 75.0 |
| Vinyl palmitate | 10.0 |
| Crotonic acid | 10.0 |
| Ditertiary butyl peroxide | 3.5 |
| Polyacrylate | 1.5 |

Example 9

| | Parts by weight |
|---|---|
| Vinyl butyrate | 60.0 |
| Vinyl arachidate | 25.0 |
| Crotonic acid | 10.0 |
| Diacetyl peroxide | 2.0 |
| Gum arabic | 1.5 |
| Lauryl mercaptan | 1.5 |

Example 10

| | Parts by weight |
|---|---|
| Vinyl butyrate | 68.0 |
| Vinyl pentadecylate | 17.0 |
| Crotonic acid | 10.0 |
| Tertiary butyl hydroperoxide | 2.5 |
| Gelatin | 1.5 |
| Lauryl mercaptan | 1.0 |

Example 11

| | Parts by weight |
|---|---|
| Vinyl acetate | 78.50 |
| Vinyl nondecylate | 15.35 |
| Crotonic acid | 6.0 |
| Hydrogen peroxide | 0.05 |
| Gum tragacanth | 0.05 |
| Lauryl mercaptan | 0.05 |

In accordance with the present invention, an opacifier latex may be prepared with the use of an emulsifying resin prepared as illustrated in Examples 1 to 11 by the emulsion polymerization of one of vinyl monomer or ethylene where the emulsifying terpolymer is dissolved in aqueous alkali and the vinyl monomer or ethylene and a catalyst is added thereto and the reaction mixture heated for a sufficient period of time to complete the polymerization reaction.

Preferably, although not necessarily, a quantity of surface-active agent is added to the mixture. Substantially any anionic or non-ionic surface active agent may be used.

Suitable catalysts for carrying out the emulsion polymerization of this invention are any of those previously described as suitable for use in preparing the emulsifying resin. Oil-soluble catalysts may be dissolved in the monomer and water-soluble catalysts may be dissolved in the aqueous phase. A combination of both oil- and water-soluble catalysts may be employed.

Polymerization may be carried out by use of a "redox" catalyst system. Easier control of temperature and polymer distribution in copymers may be achieved by adding a reducing agent with the catalyst. In order to prevent too rapid a temperature rise, only 5 to 20% by weight of the monomers are added initially. Subsequent addition of the remaining monomer may be carried out over a 30-minute to 2-hour period. By suitable adjustment of monomer addition rate, temperature may be controlled to within fairly narrow limits. Emulsion polymerization may be run at room temperature or below by suitable choice of a redox system.

Generally, any reducing agent that will react with a peroxide catalyst to produce a free radical may be employed in a "redox" catalyst system. Reducing agents that have been employed in these systems include sodium bisulfite, dithionite, zinc formaldehyde sulfoxylate, ferrous iron salts and ascorbic acid. Many useful redox systems have not yet been exploited in emulsion polymerization recipes so that the foregoing list is not meant to limit the practice of this invention.

Polymerization may be carried out under pressure. If ethylene or a vinyl monomer gaseous at room temperature, e.g., vinyl chloride, butadiene or the like, or highly volatile at room temperature, e.g., vinylidene chloride or the like is selected, polymerization may be carried out in a sealed vessel, agitation being obtained by tumbling the container in a temperature controlled bath or by an agitator operating through a pressure packed bearing.

Part or all of the monomer may be pre-emulsified by mixing part or all of the surfactant or the resin, or both, with a small quantity of the water. The resulting premix is then added to the larger quantity of water containing the remainder, if any, of the surfactant and resin. The rate of addition may be adjusted to maintain a desired temperature and a "redox" catalyst system may be used.

The reaction may be carried out in multiple stages. In order to make the reaction easy to control, a portion of the monomer is emulsified and polymerized by using any of the modifications described above or any others known to those skilled in the art of emulsion polymerization. Thereafter, to the resulting polymer, sometimes referred to as a "heel," an additional quantity of monomer is added and polymerized by addition of catalyst. This second addition may be accompanied by additional surfactant or resin. Further polymerizations may also be carried out. This technique is of special value when an emulsion polymer of very high solids content is sought.

Sufficient alkali is added to the aqueous solution of resin to react stoichiometrically with all of the resin present. Suitable alkalies are ammonium, potassium and sodium hydroxides or amines, such as monoethanol or triethanolamine. The alkali may be added in quantity up to 30% in excess of the stoichiometric amount if desired.

A latex suitable for use as an opacifier in detergents, cosmetic products, and the like, may be prepared in accordance with the method of this invention as follows: From 2 to 100 parts of the terpolymer prepared as in Examples 1 to 11 is dissolved in a suitable quantity of aqueous alkaline solution to give a pH of 8.6–9.6. The quantity of water is adjusted to give a final emulsion solids ranging from 25 to 60%. A surface active agent is added in any desired quantity, although, in general, up to 3% by weight based on the weight of monomer to be emulsified will be found adequate. 200 parts of ethylene or emulsion polymerizable vinyl monomer is added. Following mixing, the reaction temperature is raised to 150° F.–200° F. for 1 to 3 hours, or longer if required, additional catalyst is added as required until the residual monomer content is less than 0.5% of the original monomer weight. The product is cooled and filtered.

The following examples illustrate the preparation of an opacifier latex in accordance with the method of this invention:

*Example 12*

40 parts of vinyl acetate/vinylstearate/crotonic acid polymer in Example 1 was dissolved in 500 parts of aqueous alkali and ammonia was added to adjust the pH of the solution to between 9.4 and 9.8. To the resulting solution was added 4 parts of sodium lauryl sulfate. Thereafter, 160 parts of styrene and 40 parts of 2-ethylhexyl acrylate were slowly added with stirring. The temperature of the mixture was raised to 120° F. and then 1 part of ammonium persulfate was added, after which the temperature was steadily raised to between 150° F. and 170° F. Thereafter, the temperature rose to about 180° F. to 200° F. from exothermic heat of reaction. This last temperature level was maintained for 30 to 40 minutes or until the residual monomer content was less than 0.5 part.

After filtering the resulting opacifier latex was used to opacify a detergent formulation comprising the sodium salt of tridecylbenzene sulfonate, 15 parts, the ammonium salt of a sulfate of isooctylphenyl nonakis(ethoxy)ethanol 6 parts, isopropanol 10 parts and water 69 parts by adding with agitation an opacifying amount, 0.2 part of the latex per 100 parts of detergent formulation.

The product immediately took on a pleasing, milky translucency. After storage for a considerable period, over 6 months, no deterioration of opacity or apparent inhomogeneity was noted.

*Example 13*

Ten parts of terpolymer prepared as in Example 2 and 7.5 parts of sodium benzene sulfonate are dissolved in 500 parts of aqueous alkaline solution. The pH of the solution is adjusted with ammonia to 9.0 to 9.5. Thereafter, 160 parts of styrene and 40 parts of 2-ethylhexyl acrylate are added. The mixture is heated to 120° F. and 1 part of ammonium persulfate is added and polymerization is effected. A stable emulsion of styrene/2-ethylhexyl acrylate polymer is obtained.

Following the procedures of Example 12 except as otherwise specified additional opacifier latices were prepared employing various terpolymers as emulsifying resins.

*Example 14*

| | Parts |
|---|---|
| Resin (prepared as in Example 2) | 50 |
| Sodium benzene sulfonate | 3 |
| Vinyl toluene | 200 |
| Benzoyl peroxide | 1 |

*Example 15*

| | Parts |
|---|---|
| Terpolymer (prepared as in Ex. 3) | 30 |
| Sodium benzene sulfonate | 6 |
| Vinyl chloride | 200 |
| Diacetyl peroxide | 3 |

*Example 16*

| | Parts |
|---|---|
| Terpolymer (prepared as in Ex. 4) | 100 |
| Styrene | 100 |
| Butadiene | 100 |
| Hydrogen peroxide | 1.5 |

*Example 17*

| | Parts |
|---|---|
| Terpolymer (prepared as in Ex. 5) | 90 |
| Sodium benzene sulfonate | 1 |
| Vinyl propionate | 150 |
| 2-ethylhexyl acrylate | 50 |
| Ditertiary butyl peroxide | 1.9 |

*Example 18*

| | Parts |
|---|---|
| Terpolymer (prepared as in Ex. 6) | 20 |
| Sodium lauryl sulfate | 6 |
| Vinyl butyrate | 175 |
| Butadiene | 25 |
| Tertiary butyl hydroperoxide | 3.5 |

*Example 19*

| | Parts |
|---|---|
| Terpolymer (prepared as in Ex. 7) | 80 |
| Sodium lauryl sulfate | 1 |
| Vinyl acetate | 180 |
| Ethyl methacrylate | 20 |
| Ammonium persulfate | .05 |

*Example 20*

| | Parts |
|---|---|
| Terpolymer (prepared as in Ex. 8) | 70 |
| Ethylene | 200 |
| Benzoyl peroxide | 1.5 |

*Example 21*

| | Parts |
|---|---|
| Terpolymer (prepared as in Ex. 9) | 40 |
| Sodium benzene sulfonate | 5 |
| Styrene | 150 |
| Methyl methacrylate | 50 |
| Ammonium persulfate | 1 |

CONTROL II

An opacified detergent formulation was prepared.

To a detergent formulation comprising the sodium salt of tridecylbenzene sulfonate, 15 parts, the ammonium salt of a sulfate of isooctylphenyl nonakis(ethoxy)ethanol 6 parts, isopropanol 10 parts and water 69 parts was added an opacifying amount, 0.2 part of the copolymer emulsifier in Control I per 100 of detergent formulation.

The product immediately takes on a pleasing milky translucency. In less than 48 hours however, considerable deterioration manifested by creaming and phase separation occurs with loss of opacity. This instability resulting from the use of vinyl acetate/crotonic acid copolymer is to be contrasted with the long term stability achieved by including a higher vinyl ester like vinyl stearate in the emulsifying resin as exemplified in Example 12.

CONTROL III

Using the procedures of Control II, another detergent formulation is prepared substituting however, as the dispersing resin a terpolymer not within the monomer ratios of the present invention but composed of vinyl acetate, vinyl stearate and crotonic acid in a ratio of 89:1:10 which is generally prepared as in Example 1. A translucent detergent formulation is obtained. After standing for less than a week however, there is a change in overall opacity as "cream" appears.

Thus it is seen that the use of a lower vinyl ester and crotonic acid copolymer (Control II) or a terpolymer containing less than 3 parts per 100 of the terpolymer of higher vinyl ester (Control III) does not produce stable dispersions.

*Example 22*

A cosmetic formulation, a hand cream comprising:

| | Parts |
|---|---|
| Oxidized cholesterol | 0.30 |
| Stearyl alcohol | 0.25 |
| Vegetable oil | 2.5 |
| Stearic acid | 1.5 |
| Triethanol amine | 0.5 |
| Glycerol | 6 |
| Ethanol | 6 |
| Water | 78 | is opacified by the addition of the dispersed resin prepared in Example 12.

The product immediately took on a pleasing milky translucency. After storage for a considerable period, over 6 months, no deterioration of opacity or apparent inhomogeneity was noted.

As indicated, the opacifier latex produced in the present invention is useful in preparing opacified detergent formulations. Generally, the ingredients of such formulations will include in addition to the detergent material, builders such as sodium tripolyphosphate and pyrophosphate, alcohol and water. Suitable as detergent materials herein are water soluble anionic organic sulfate and sulfonate and non-ionic organic detergents. One or more of these detergents can be used.

In general, the non-ionic detergent which are suitable are water soluble non-ionic polyalkylene oxide detergents such as produced by the introduction of alkylene oxide group into an organic hydrophobic compound or group having an aliphatic or aromatic structure. The hydrophobic organic group generally contains at least 8 carbon atoms and up to about 30 carbon atoms. Condensed with the hydrophobic group are at least 5 and preferably up to about 50 alkylene oxide groups. It is preferred to use the polyoxyethylene condensates derived from ethylene oxide although other lower alkylene oxides such as propylene oxide, butylene oxide and the like have generally similar properties and can be substituted for all or part of the ethylene oxide. Among the non-ionic detergents, it is preferred to use the polyalkylene oxide condensates of alkyl phenol, such as the polyoxyethylene ethers of alkyl phenols having an alkyl group of at least about six, and usually about 8 to 12 carbons, and an ethylene oxide ratio (No. of moles per phenol) of about 7.5, 8.5, 11.5 and 20, though the number of ethylene oxide groups will be usually from about 8 to 18. The alkyl substituent on the aromatic nucleus may be di-iso-butylene, diamyl, polymerized propylene, dimerized $C_6$–$C_7$ olefin, and the like.

Further suitable detergents are the polyoxyalkylene esters of organic acids, such as the higher fatty acids, rosin acids, tall oil acids, or acids from the oxidation of petroleum, etc. These polyglycol esters will contain usually from about 12 to about 30 moles of ethylene oxide or its equivalent and about 8 to 22 carbons in the acyl group. Suitable products are refined tall oil condensed with 16 or 20 ethylene oxide groups, or similar polyglycol esters of lauric, stearic, oleic acids, etc.

Additional non-ionic agents are the polyalkylene oxide condensates with higher fatty acid amides, such as the higher fatty acid primary amides, mono- and di-ethanolamides. Suitable agents are coconut fatty acid amide condensed with about 10 to 50 moles of ethylene oxide. The fatty acyl group will have similarly about 8 to 22 carbons, and usually about 10 to 18 carbon atoms, in such products. The corresponding sulfonamides may be used also if desired.

Other suitable polyether non-ionic detergents are the polyalkylene oxide ethers of higher aliphatic alcohols. Suitable fatty alcohols having a hydrophobic character, preferably 8 to 22 carbons, are lauryl, myristyl, cetyl, stearyl and oleyl alcohols which may be condensed with an appropriate amount of ethylene oxide, such as at least about 6, and preferably about 10 to 30 moles. A typical product is oleyl alcohol condensed with about 12, 15 or 20 moles of ethylene oxide. The corresponding higher alkyl mercaptans or thioalcohols condensed with ethylene oxide are suitable in the present invention also. The water-soluble polyoxyethylene condensates with hydrophobic polyoxypropylene glycols may be employed also.

Further suitable non-ionic detersive materials are the higher fatty acid alkanolamides, such as the monoethanolamides, diethanolamides and isopropanolamides wherein the acyl radical has about 10 to 14 carbon atoms. Examples are coconut (or equivalent lauric), capric and myristic diethanolamide, monoethanolamide and isopropanolamide.

Other suitable synthetic detergents are water-soluble higher alkyl aryl sulfonate detergents particularly those having from 8 to about 15 carbon atoms in the alkyl group. It is preferred to use the higher alkyl benzene sulfonate detergent for optimum effects, though other similar detergents having a mono-nuclear aryl nucleus, such as toluene, xylene, or phenol, may be used also. The higher alkyl substituent on the aromatic nucleus may be branched or straight-chained in structure, examples of such group being nonyl, dodecyl and pentadecyl groups derived from polymers of lower mono-olefins, decyl, keryl, and the like.

Examples of suitable aliphatic detergents are the normal and secondary higher alkyl sulfate detergents, particularly those having about 8 to 15 carbons in the fatty alchol residue, such as lauryl (or coconut fatty alcohol) sulfate. Other suitable detergents are the sulfuric acid esters of polyhydric alcohols incompletely esterified with higher fatty acids, e.g., oleic acid ester of isethionic acid; The higher fatty acid (e.g., coconut) ethanolamide sulfate; the higher fatty acid amide of amino alkyl sulfonic acids, e.g., lauric acid amide of taurine; and the like.

These sulfate and sulfonate detergents are used in the form of their water-soluble salts, such as the alkali metal and nitrogen-containing, e.g., lower alkylolamine, salts. Examples are the sodium potassium, ammonium, isopropanolamine, mono- and tri-ethanolamine salts of said higher alkyl benzene sulfonate, higher alkyl sulfate and the like. In commercial practice, it is preferred to use the alkali metal salts.

Although this invention has been described with reference to specific method steps and materials, it will be appreciated that equivalent method steps and chemicals may be utilized without departing from the spirit and scope of this invention. For example, departures may be made in both materials and processes with respect to the specific components of either the emulsifying terpolymer or the opacifier latex and the percentages and proportions thereof as well as the specific steps and type of process, all without departing from the spirit and scope of this invention. The term "consisting essentially of" as used in the following claims is intended to leave these claims open to the inclusion of ingredients which do not materially affect the basic and novel characteristics of the compositions defined in such claims.

I claim:

1. Composition consisting essentially of an aqueous alkaline solution of a terpolymer of from 55 to 94 parts of a lower vinyl ester of a saturated aliphatic acid having from 2 to 4 carbon atoms inclusive, 3 to 35 parts of a higher vinyl ester of a saturated aliphatic acid having from 12 to 22 carbon atoms inclusive, and 3 to 10 parts of crotonic acid per 100 parts by weight of the terpolymer and dispersed in said solution a solid polymer selected from the group consisting of ethylene polymers and polymers of vinyl monomers which can be normally polymerized without hydrolysis; the amount of terpolymer present being between 1 part per 1 to 20 parts by weight of solid polymer and sufficient to maintain the solid polymer dispersed.

2. Composition claimed in claim 1 wherein the dispersed solid polymer is an ethylene polymer.

3. Composition claimed in claim 1 wherein the dispersed solid polymer is a polymer of a vinyl monomer which can be normally polymerized without hydrolysis.

4. Composition claimed in claim 3 wherein the dispersed solid vinyl polymer is a vinyl chloride polymer.

5. Composition claimed in claim 3 wherein the dispersed solid vinyl polymer is a styrene polymer.

6. Composition claimed in claim 1 wherein the terpolymer is of 70 to 94 parts of the lower vinyl ester, 10 to 20 parts of the higher vinyl ester and 3 to 10 parts of the crotonic acid per 100 parts by weight of the terpolymer.

7. Composition claimed in claim 6 wherein the lower vinyl ester is vinyl acetate.

8. Composition claimed in claim 7 wherein the higher vinyl ester is vinyl stearate.

9. Composition claimed in claim 8 wherein the dispersed solid polymer is a styrene polymer.

10. Composition claimed in claim 9 wherein the styrene and an acrylic acid ester containing 2 to 8 carbon atoms in the ester group.

11. Composition claimed in claim 8 wherein the dispersed solid polymer is ethylene polymer.

12. Detergent formulation consisting essentially of a water soluble detergent selected from the group consisting of anionic organic sulfate and sulfonate and non-ionic organic detergents and an opacifier latex comprising the composition claimed in claim 1.

13. Detergent formulation consisting essentially of a water soluble detergent selected from the group consisting of anionic organic sulfate and sulfonate and non-ionic organic detergents and an opacifier latex comprising the composition claimed in claim 8.

14. Detergent formulation consisting essentially of a water soluble detergent selected from the group consist- of anionic organic sulfate and sulfonate and non-ionic organic detergents and an opacifier latex comprising the composition claimed in claim 11.

15. Method of opacifying a detergent formulation comprising dispersing in an aqueous solution of a detergent selected from the group consisting of anionic organic sulfate and sulfonate and non-ionic organic detergents an opacifying amount of an opacifier latex comprising the composition claimed in claim 1.

References Cited by the Examiner

UNITED STATES PATENTS

| 2,263,598 | 11/1941 | Starck et al. | 260—86 |
| 2,545,702 | 3/1951 | Norris | 260—23 |

FOREIGN PATENTS

| 1,252,236 | 12/1960 | France | 260—29.6 |

LEON D. ROSDOL, *Primary Examiner.*

SAMUEL H. BLECH, *Examiner.*

I. GLUCK, *Assistant Examiner.*